PRODUCTION OF DIRECT AND DELAYED PULSES IN RESPECTIVE CIRCUITS EACH HAVING LEVEL-SETTING CLAMPS

Filed Aug. 14, 1957

FIG. 2b. VOLTAGE AT TERMINAL 18

FIG. 2c. VOLTAGE AT TERMINAL 23

INVENTOR:
GEORGE L. JOHNSON,
BY Donald C Kearney
HIS ATTORNEY.

United States Patent Office 3,047,734

Patented July 31, 1962

3,047,734
PRODUCTION OF DIRECT AND DELAYED PULSES IN RESPECTIVE CIRCUITS EACH HAVING LEVEL-SETTING CLAMPS

George L. Johnson, East Syracuse, N.Y., assignor to General Electric Company, a corporation of New York Filed Aug. 14, 1957, Ser. No. 678,120
5 Claims. (Cl. 307—88.5)

Figure 1:
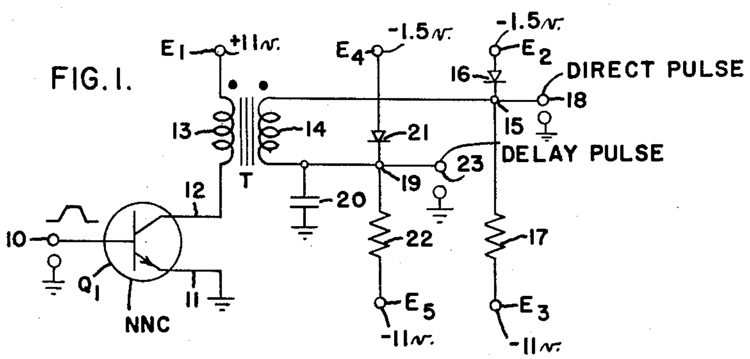

This invention relates to a pulse producing circuit. More particularly, this invention relates to a transformer coupled pulse producing circuit providing both a normal and a delayed pulse output and particularly adapted for use in dynamic circuit techniques in digital computer and data processing equipment.

Such circuit techniques are described, for example, in an article entitled "Dynamic Circuit Techniques Used in SEAC and DYSEAC" by Robert D. Elbourn and Richard D. Witt appearing at page 1380 of volume 41, October 1953 "Proceedings of the Institute of Radio Engineers." As noted in this article, such circuitry is typically operated as a synchronous system having a master clock frequency of one megacycle by applying a clock pulse to one terminal of the input "and" gate feeding each amplifier. Since there is an inherent delay of approximately 0.1 microsecond associated with the normal pulse output of each amplifier, nearly optimum system operation is obtained if a four phase clock is used in conjunction with the technique of "generative pulse broadening" described by Elbourn and Witt. In this manner the output of one amplifier can be used directly as an input to another amplifier if the second amplifier is clocked with the next lagging clock phase of the system. In order to use the output of the first amplifier as an input to a later amplifier which is clocked with any other clock phase, however, additional delay must be provided by some type of delay line or network. Such delay lines tend to be bulky and relatively expensive and often introduce undesirable attenuation and temperature sensitivity into the system.

It is therefore an object of this invention to provide a pulse producing circuit which inherently provides both a normal output pulse and a delayed output pulse in response to a single input pulse.

It is a further object of this invention to provide a pulse producing circuit which eliminates or reduces the need for the use of delay lines in apparatus using dynamic circuit techniques.

It is a further object of this invention to provide a means for utilizing the energy stored in the magnetizing inductance of a pulse transformer by an input pulse to derive an output pulse from the secondary winding of the transformer which is delayed in time with respect to the normal output pulse derived by transformer action.

It is a further object of this invention to provide a new and improved signal processing arrangement.

Briefly, in accordance with one aspect of the invention, each end of the secondary winding in a transformer coupled pulse amplifier is provided with separate clamping means and a separate output terminal. Both ends of this secondary are preferably clamped to the same reference voltage. When an input pulse is applied to the primary winding of the transformer, a first output pulse will appear at one end of the secondary winding by normal transformer action. The production of this first pulse requires not only a load current but also a magnetizing current in the transformer. This magnetizing current stores energy in the magnetizing inductance of the transformer. This stored energy, which has in the past been wasted in the form of a backswing transient, is utilized to provide a second delayed pulse output at the second terminal made available at the other end of the secondary winding.

While the novel and distinctive features of the invention are particularly pointed out in the appended claims, a more expository treatment of the invention, in principle and in detail, together with additional objects and advantages thereof, is afforded by the following description and accompanying drawings in which:

FIG. 1 is a schematic circuit diagram of a pulse producing circuit in accordance with the present invention.

Figure 2A:
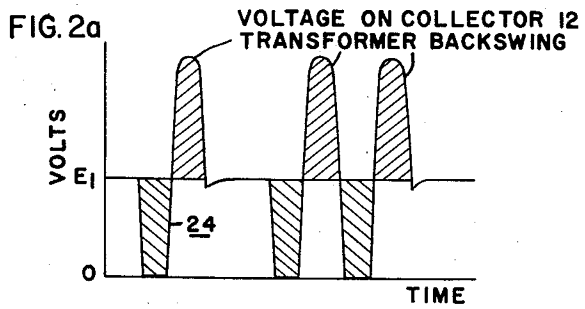
Figure 2A:
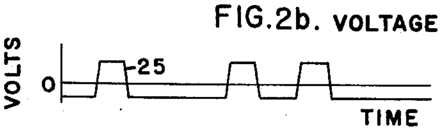
Figure 2A:
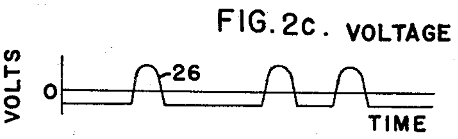

FIGS. 2*a*, 2*b*, and 2*c* are volt-time graphs illustrating waveforms which occur in the circuit of FIG. 1.

Figure 3:
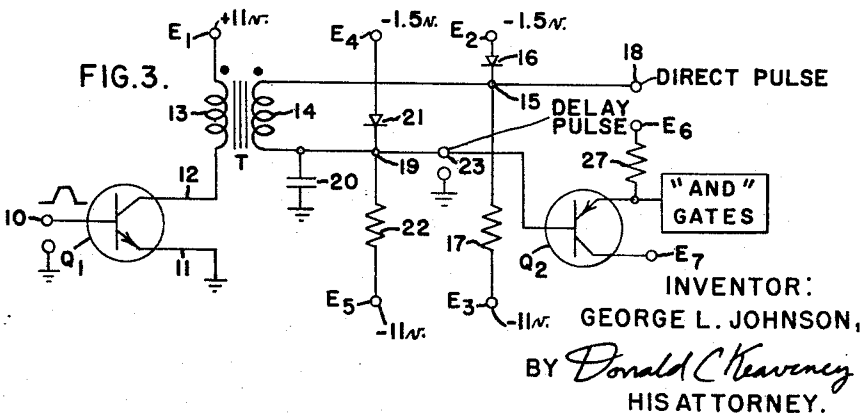

FIG. 3 is a schematic circuit diagram showing one way in which circuit of FIG. 1 may be used to drive a plurality of load circuits.

In FIG. 1 transistor Q1 is shown connected as a grounded emitter amplifier. The base electrode 10 of transistor Q1 affords an input terminal to the amplifier stage. Emitter electrode 11 is connected to ground, while collector electrode 12 is connected through the primary winding 13 of a pulse transformer T to a source of unidirectional voltage of fixed magnitude E1. Pulse transformer T is preferably a ferrite core pulse transformer with an open circuit primary inductance or magnetizing inductance of Lm and a stepdown turns ratio of N1:N2. Transistor Q1 is preferably but not necessarily of the junction type. In one particular exemplary embodiment of the circuit a type 2N167 transistor was used with a collector supply voltage E1 of plus 11 volts.

One end of secondary winding 14 of transformer T is connected to the junction point 15 of a series connected diode 16 and resistor 17. Junction point 15 is brought out to an output terminal 18 while the other side of diode 16 and the other end of resistor 17 are connected to fixed sources of potential E2 and E3 respectively. The other end of secondary winding 14 is similarly connected to the junction point 19 of a diode 21 and resistor 22. Junction point 19 is brought out to a second output terminal 23 while diode 21 and resistor 22 have their other ends respectively connected to fixed sources of unidirectional potential E4 and E5 respectively. A condenser 20 is connected between junction 19 and ground.

It will be noted that the diodes 16 and 21 with their respective series resistors 17 and 22 are connected as clamping diodes for the two ends respectively of secondary 14 of transformer T. In the particular exemplary circuit referred to, voltage sources E2 and E4 both had a value of minus 1.5 volts with respect to ground, whereas voltage sources E3 and E5 both had a value of minus 11 volts with respect to ground. Of course, in a circuit where these relationships exist it is in fact necessary to use only two voltage sources rather than four. That is to say, one power supply can provide both voltages E2 and E4 and a second power supply can provide both voltages E3 and E5 so that (counting the collector supply E1 for transistor Q1) the circuit of FIG. 1 requires only three separate power supplies.

In practice, the output from terminal 18 would be connected to a utilization circuit such as the input "and" gate of another pulse amplifier. Resistor 17 serves as the hold-down or load resistor for this output. Resistor 22 has a similar function with respect to output terminal 23 and also acts as a damping resistor for the magnetizing current in the transformer in a manner which will be explained in detail below.

The operation of the circuit of FIG. 1 is illustrated in the waveform diagrams of FIGS. 2*a*, 2*b*, and 2*c*, which are graphs having time plotted as abcissa against voltage as ordinate. When the input pulses applied to the base electrode 10 of transistor Q1 are such as to produce at the collector 12 a waveform such as shown in FIG. 2*a*, then the output appearing at terminal 18 will have the form shown in FIG. 2*b* whereas the output appearing at terminal 23 will have the form shown in FIG. 2*c*.

This may be seen more clearly by considering the action of the circuit of FIG. 1 during a single pulse period. When the base of transistor Q1 is driven positive by an input pulse, the transistor will be driven into collector saturation thereby producing a negative-going pulse 24 across the transformer primary approximately equal to the magnitude of the collector supply voltage E1. By normal transformer action, the dotted terminal of the transformer secondary winding will swing positive with respect to the undotted terminal, and current will tend to flow out of the dotted end of the secondary winding. This current flow will tend to pull the undotted end negative. The undotted end of the secondary is however clamped by the forward conduction of diode 21. Thus, the winding will assume a reference potential of E4 (e.g. −1.5 volts) minus the voltage drop across diode 21 (e.g. approximately 0.3 volt), giving a reference voltage of approximately −1.8 volts in the particular exemplary circuit being discussed. The dotted end of the secondary will therefore swing in a positive direction by a voltage equal to the primary swing divided by the turns ratio. In the above discussed circuit this resultant secondary swing was 4 volts referenced at −1.8 volts. This action produces the output pulse 25 at output terminal 18. It will be noted that the maximum possible pulse amplitude is available since in this circuit there is no series diode voltage drop between the effective reference potential and the output terminal 18 as there has been in known pulse amplifier circuits of the type discussed by Elbourn and Witt.

During a primary input pulse such as shown at 24 the magnetic flux in the transformer core must increase in direct proportion to the volt-time area of the pulse and a corresponding magnetizing current is required in addition to the load current. Then after the pulse, to bring the flux and the magnetizing current down again to their original value requires an equal but negative volt-time area. In other words, a negative-going back-swing transient follows each positive pulse. During this back-swing the input pulse is, of course, not being applied and the transistor is cut-off. The demagnetizing current must therefore be supplied by the secondary winding. In effect, transistor Q1 in its cut-off state acts as an open switch to prevent current flow through primary winding 13 and forces the demagnetizing current to flow in secondary 14.

This inherent transformer back-swing will cause the dotted end of the secondary winding to swing negative with respect to the undotted end. However, the dotted end will be clamped by the forward conduction of diode 16 at a potential equal to E2 minus the voltage drop across the diode 16, giving a reference potential of approximately minus 1.8 volts in this particular exemplary circuit. This clamping forces the undotted end of the winding to swing positive during the back-swing transient, producing the positive delayed pulse 26, shown in FIG. 2*c*, which appears at output terminal 23.

If it is desired to have a pulse duty cycle as high as 50%, the back-swing transient must be damped slightly less than critically for optimum recovery. Hence it has been the practice in known amplifier circuits to choose the magnetizing inductance of the transformer such that the natural resonant frequency of the parallel L-C circuit formed by stray capacity and the magnetizing inductance is approximately equal to the maximum pulse repetition rate. As shown by Elbourn and Witt, damping is then accomplished by a damping resistor in parallel with their series diode. In the circuit of FIG. 1, on the other hand, the required damping is achieved by dumping current into resistor 22 during the back-swing transient. However, as soon as the damping resistor 22 is effectively connected to the transformer, an initial current is demanded from the transformer by the initial voltage drop across the resistor 22. This tends to make the transformer ring out faster (due to the greater initial inductive kick) than would be the case if the above noted conventional damping resistor were used. This effective change in recovery time can be compensated for by using a transformer with a larger magnetizing inductance and by using a larger damping resistor, or it can be compensated for by using a capacitor 20 connected between output terminal 23 and ground. In the above discussed exemplary circuit, the use of the capacitor 20 gave the best result since the value of resistor 22 must be picked to satisfy other conditions as well as proper damping. Note that the capacitor does not affect the circuit operation during the normal pulse period since the voltage across it will be constant and no charging current will be required by it. In fact, the use of capacitor 20 affords a further advantage by tending to filter out any undesirable high frequency noise at output terminal 23.

The value of resistor 22 is chosen to be much less than the amount of resistance which will adequately hold down a normal "and" type of logic load such as might be connected to terminal 23 so that the damping will not be materially affected by the addition of such a load. In the exemplary circuit being discussed an "and" type of load could dump approximately one milliampere of current into the damping resistor 22. Hence, it is desirable to choose the total current in resistor 22 to be at least three times this (or at least three milliamperes) at the start of the back-swing. During the back-swing, the "and" component of current in the resistor 22 will decrease and the component from the transformer will increase thereby improving the current ratio. Of course, it would be desirable to choose resistor 22 even smaller than this, but the value of Lm would then have to be reduced correspondingly. This would in turn increase the inductive load on the transistor during the normal pulse half-period.

Summarizing, once the value of resistor 22 is chosen, the values of Lm and of capacitor 20 should next be chosen to give a back-swing waveform which is sinusoidal in shape and is optimumly damped. Typical values for these quantities in the exemplary circuit discussed above are: Lm one millihenry; resistor 22, three kilohms; capacitor 20 seventy-five micromicrofarads.

In the absence of pulses across the secondary, both of the diodes 16 and 21 will be conducting. If the values of resistors 22 and 17 are of same order of magnitude, the voltage drop across the two diodes (assuming they are of the same type) will be very nearly equal. Thus, the quiescent current through the secondary of the transformer will be very nearly equal to zero. Of course, the value of resistor 17 must also be such as to adequately hold-down the particular load circuit which is connected to terminal 18 in any given application. It is further desirable to choose the value of resistor 17 so that this resistor may act as a sink for any overshoot or back-swing current which may occur following the initial back-swing pulse appearing at terminal 23. That is to say, resistor 17 should carry both normal load current and any possible overshoot current. In terms of low quiescent current in the transformer winding, the value of resistor 17 should be as nearly equal to the value of resistor 22 as is consistent with the other two above noted requirements.

If more than one "and" gate or other load must be driven simultaneously from output terminal 23, a p-n-p emitter follower amplifier can be used to handle the additional gate current as illustrated in FIG. 3. The emitter follower collector supply voltage for transistor Q2 must be sufficiently negative to prevent collector saturation in that transistor. The emitter resistor 27 connected between the bias source E6 and the emitter of transistor Q2 is used to aid in the charging of stray wiring capacity during the rise time of the pulse. A similar circuit could, of course, also be used at terminal 18 if desired.

It will be noted that if a fifty percent pulse duty cycle is used, the output at terminal 23 in FIG. 1 or 3 provides a pulse which is automatically delayed by one-half digit time with respect to the normal output pulse provided at terminal 18. Therefore in any circuit application requiring such a delay, the output from terminal 23 may be used directly without the one-half digit-time delay network which is required for use with known amplifier circuits. Furthermore, any load connected to terminal 23 will not load down the amplifier since the transistor is shut off during the back-swing period.

It should also be noted that the circuit of FIGS. 1 and 3 can be advantageously used when delay times other than one-half digit-time are required. Of course, in order to obtain a one-quarter digit-time delay, a quarter digit-time delay network must be driven from the output of terminal 18. However, where a three-quarter digit-time delay is desired, a one-quarter digit-time delay network can be driven from the output of terminal 23. For a delay as short as one-quarter digit-time (0.25 microsecond in a one megacycle system) a relatively simple and inexpensive delay network can be satisfactorily used.

In general, such relatively short delays of three-quarter digit-time or less make up the bulk of the total number of delays required in a system. It has been shown that the pulse amplifier of FIGS. 1 and 3 will provide any desired delay up to three-quarters digit-time by using a delay line of not more than one-quarter digit-time delay. If longer delay periods are required, a plurality of pulse amplifiers of the type shown in FIGS. 1 or 3 may be connected as pulse repeaters to utilize the automatic timing and reshaping features inherent in the basic amplifier when they are used in circuitry of the type discussed by Elbourn and Witt. In this manner one may achieve any desired delay without using delay lines of longer than one-quarter digit-time delay period and thus avoid the use of delay lines which require an extremely low temperature coefficient or which must be precisely manufactured to exacting standards.

While a transistorized pulse producing circuit has been discussed as a preferred specific embodiment of the invention, it should be noted that the concept of clamping the two ends of a single secondary winding in order to utilize the energy stored in the magnetizing inductance of a pulse transformer to provide a second pulse output at one end of the secondary which is automatically delayed with respect to a first or normal pulse output at the other end of the secondary is also applicable to vacuum tube or other amplifier circuits. It will also be understood, of course, that although the circuits of FIGS. 1 and 3 show solid state diodes as the clamping means for the two ends of the secondary winding, any other suitable clamping means could also be used.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim as new and desire to secure by Letters Patent of the United States is:

1. A plural pulse producing circuit comprising, a pulse amplifying device capable of functioning as a switch and having at least an input electrode and an output electrode; means to apply an input pulse to said input electrode; a pulse transformer having a primary winding and a secondary winding; means to apply unidirectional energy of fixed value connected to one end of said primary winding, the other end of said primary winding being connected to said output electrode of said amplifying device; first means to clamp one end of said secondary winding to a predetermined voltage, second means to clamp the other end of said secondary winding to a predetermined voltage, third means to derive a first output pulse from said one end of said secondary winding responsive to an input applied to said input electrode, and fourth means to derive a second output pulse from said other end of said secondary winding, said second pulse being delayed in time with respect to said first pulse and having a volt-time area substantially equal in absolute value to the volt-time area of said first output pulse.

2. A pulse producing circuit comprising a transistor having at least base, emitter, and collector electrodes; a pulse transformer having a primary and a secondary winding; a first means to apply unidirectional potential of fixed magnitude; one end of said primary winding being connected to said means to apply said first source of potential, the other end of said primary winding being connected to the collector of said transistor; means connecting the emitter of said transistor to ground, and means to apply an input pulse to the base of said transistor; means to apply second and means to apply third sources of unidirectional potential of fixed magnitude respectively; a first unidirectionally conducting device and a first resistor connected in series between said means to apply second and said means to apply third unidirectional potentials, a first end of said secondary winding being directly connected to the junction point of said first unidirectionally conducting device and said first resistor; a second unidirectionally conducting device and a second resistor connected in series between said means to apply second and said means to apply third unidirectional potentials, the second end of said secondary winding being directly connected to the junction point of said second unidirectionally conducting device and said second resistor; a capacitor connected between said second end of said secondary winding and ground; and first and second pulse output terminals connected respectively to said first and second ends of said secondary winding.

3. Apparatus as in claim 2 and further including an emitter-follower transistor amplifier stage having its input connected to said second pulse output terminal.

4. In combination, a pulse transformer having a primary and a secondary winding; first means to apply unidirectional potential of fixed magnitude; one end of said primary winding being connected to said first means to apply a potential, the other end of said primary winding being connected through a switch to a source of pulses; second means and third means to apply unidirectional potentials of fixed magnitude respectively; a first unidirectionally conducting device and a first resistor connected in series between said second and third means to apply unidirectional potential, a first end of said secondary winding being directly connected to the junction point of said first unidirectionally conducting device and said first resistor; a second unidirectionally conducting device and a second resistor connected in series between said second and third means to apply unidirectional potential, the second end of said secondary winding being directly connected to the junction point of said second unidirectionally conducting device and said second resistor; a capacitor connected between said second end of said secondary winding and ground; and first and second pulse output terminals connected respectively to said first and second ends of said secondary winding.

5. In combination, a pulse transformer having a primary input winding and a secondary output winding; switching means having sharp cut-off capabilities connected to apply an input pulse to said primary winding and to sharply cut-off the delivery of power to said primary winding following the decay of said pulse, said switching means serving through its sharp cut-off capabilities to stop the flow of current in the primary winding; means comprising a first diode connected to clamp a first end of said secondary winding to a predetermined voltage level; means comprising a second diode connected to clamp the second end of said secondary winding to the same predetermined voltage level; means responsive to said applied input pulse to derive a first output from only said first end of said secondary winding; and means to utilize energy stored in said transformer by said input pulse to derive a second output pulse from only said second end of said secondary winding, each of said first and second output pulses having the same polarity relative to said predetermined clamping voltage level, said second output pulse being delayed in time with respect to said first output pulse and having a volt-time area substantially equal in absolute value to the volt-time area of said first output pulse.

References Cited in the file of this patent

UNITED STATES PATENTS 1,501,569 Osnos ---------------- July 15, 1924

2,298,657 Smith et al. ------------ Oct. 13, 1942
2,339,466 Duft ---------------- Jan. 18, 1944
2,529,172 Moe ---------------- Nov. 7, 1950
2,647,958 Barney -------------- Aug. 4, 1953
2,731,571 Chance -------------- Jan. 17, 1956
2,809,240 Freedman ------------ Oct. 8, 1957
2,899,553 Horton -------------- Aug. 11, 1959

OTHER REFERENCES

Deuitch: D. E. Publication Electronics, May 1956, pages 160–161.